(12) United States Patent
Kawaguchi

(10) Patent No.: US 12,463,803 B2
(45) Date of Patent: Nov. 4, 2025

(54) DATA HOLDING SYSTEM

(71) Applicant: Nomura Research Institute, Ltd., Tokyo (JP)

(72) Inventor: Masashi Kawaguchi, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 167 days.

(21) Appl. No.: 18/237,972

(22) Filed: Aug. 25, 2023

(65) Prior Publication Data

US 2024/0146515 A1 May 2, 2024

(30) Foreign Application Priority Data

Oct. 31, 2022 (JP) ................... 2022-174915

(51) Int. Cl.
*H04L 29/06* (2006.01)
*H04L 9/00* (2022.01)
*H04L 9/08* (2006.01)

(52) U.S. Cl.
CPC .............. *H04L 9/085* (2013.01); *H04L 9/008* (2013.01)

(58) Field of Classification Search
None
See application file for complete search history.

(56) References Cited

U.S. PATENT DOCUMENTS

| | | | |
|---|---|---|---|
| 8,483,386 B2 * | 7/2013 | Obana | H04L 9/085 |
| | | | 705/75 |
| 9,230,075 B1 * | 1/2016 | Robinson | H04L 63/083 |
| 2015/0288662 A1 * | 10/2015 | Bilogrevic | H04L 65/403 |
| | | | 713/168 |
| 2015/0349958 A1 * | 12/2015 | Lindell | G06F 21/31 |
| | | | 713/168 |
| 2020/0044863 A1 * | 2/2020 | Yadlin | G06F 9/54 |
| 2020/0228325 A1 * | 7/2020 | Fan | G06N 20/00 |
| 2020/0389304 A1 * | 12/2020 | Gryb | H04L 9/085 |
| 2021/0258149 A1 * | 8/2021 | Kawaguchi | H04L 9/0819 |
| 2023/0120202 A1 * | 4/2023 | Yanai | H04L 9/3006 |
| | | | 380/277 |
| 2023/0177496 A1 * | 6/2023 | Le Van Gong | G06Q 20/3829 |
| 2023/0325252 A1 * | 10/2023 | Ming Chang | G06N 3/063 |
| | | | 718/104 |

FOREIGN PATENT DOCUMENTS

JP 2021-128261 A 9/2021

* cited by examiner

*Primary Examiner* — Maung T Lwin
(74) *Attorney, Agent, or Firm* — RANKIN, HILL & CLARK LLP

(57) ABSTRACT

A data holding system holds n pieces of shares to be utilized for (m, n) secret distribution based multi-party computation (MPC) in n pieces of share holding servers in a distributed manner, and makes a new revision by updating each share based on a random number cooperatively in each of the share holding servers, to cancel an influence of the random number at a time of restoration of original data. In a case of an access state in which access to the share of the same revision occurs or is likely to occur in (m−1) pieces of the share holding servers, access to the held share is locked in other (n−(m−1)) pieces of the share holding servers.

8 Claims, 7 Drawing Sheets

| SHARE A | 15 | +3 | +6 | +11 | +8 | +3 | +14 | +15 | +6 | +5 |
| ORIGINAL DATA | 7 | +0 | +0 | +0 | +0 | +0 | +0 | +0 | +0 | +0 |
| SHARE B | 8 | +13 | +10 | +5 | +8 | +13 | +2 | +1 | +10 | +11 |

DATA HOLDING SYSTEM

BACKGROUND OF THE INVENTION

1. Technical Field

The present invention relates to a technique for holding data, and particularly relates to a technique that is effective by being applied to a data holding system for holding data divided by a secret distribution method.

2. Description of the Related Art

Widespread use of crypto-assets (virtual currency) using blockchain technology has progressed. Since a secret key of an account of a user is signed at a time of remittance of crypto-assets or the like, the secret key needs to be managed so as not to be known to others other than the user by concealing and managing.

In concealing and managing the secret key, for example, in a case of concealment by a password and encryption, there is a risk of easy decryption due to breach of the password. Therefore, there is also a method of dividing data of the secret key into a plurality of shares (data with which the original secret key is not able to be restored unless a predetermined number or more of pieces of data are collected) by using a so-called secret distribution technology, and holding the divided shares in a distributed manner under control of different servers or different parties.

At this time, assuming that the data of the original secret key is restored each time from a state of secret distribution in the form of the share in order to perform processing such as signature, there is a risk that breach or the like occurs while the data exists as the secret key after being restored. Therefore, a technique is also used in which processing such as signature is performed without restoration of the secret key distributed in the form of the share, by using technology of secret distribution based multi-party computation (MPC) for obtaining a result by performing computation in a state of secret distribution in the form of the share.

With such technology, security of the secret key is greatly enhanced, but security is not able to be completely maintained even with the secret distribution technology. For example, administrators or the like having authority to access a share in individual parties that hold the share can restore the secret key by colluding to acquire a required number or more of shares (including leakage of shares due to lack of ability of the administrators or the like).

In this way, as a technique related to a measure against breach of a secret due to collusion by participants of MPC, for example, JP 2021-128261 A discloses that a value of a share of each device participating in the MPC is periodically updated on the basis of a random number in each environment, a method is designed such that an influence of the random number is canceled and original data is restored by combining shares of the individual devices updated based on the random number, and a revision of a share that is periodically updated and access history information for the share of the revision are recorded in association with each other.

SUMMARY OF THE INVENTION

According to the related art as described in JP 2021-128261 A, the original secret key is not leaked unless a predetermined number or more of shares of the same revision are leaked. Therefore, even if the administrators or the like of individual parties colludes, a time limit can be set, safety can be enhanced. Further, even if the predetermined number or more of shares of the same revision are leaked, it is possible to narrow down the administrators or the like who collude since the access history information is associated, which makes it possible to enhance traceability and serves as a deterrent against collusion.

Whereas, it becomes difficult for the administrators or the like to collude and leak the share of the same revision to obtain the secret key, but is not completely impossible even if such measures are taken. In addition, although it is possible to narrow down the administrators or the like who have leaked the share later, it does not mean that there has been no leakage itself. However, since leakage of the secret key leads to leakage of crypto-assets, strict avoidance of leakage is required.

Therefore, an object of the present invention is to provide a data holding system that more securely holds a share obtained by secret distribution from original data such as a secret key.

The above-described and other objects and novel features of the present invention will be clarified by the description herein and the attached drawings.

A representative embodiment of the invention disclosed in the present application will be briefly overviewed as follows:

A data holding system that is a representative embodiment of the present invention is a data holding system that holds n pieces of shares to be utilized for (m, n) secret distribution based multi-party computation (MPC) in n pieces of share holding servers in a distributed manner, and makes a new revision by updating each share based on a random number cooperatively in the share holding servers each, to cancel an influence of the random number at a time of restoration of original data, wherein, in a case of an access state in which access to a share of the same revision occurs or is likely to occur in (m−1) pieces of the share holding servers, access to a held share is locked in other (n−(m−1)) pieces of the share holding servers.

Advantageous effects of the invention disclosed in the present application that are achieved by a representative embodiment will be briefly described as follows.

That is, according to the representative embodiment of the present invention, it is possible to more securely hold a share obtained by secret distribution from original data such as a secret key.

DETAILED DESCRIPTION

Figures 1, 2:
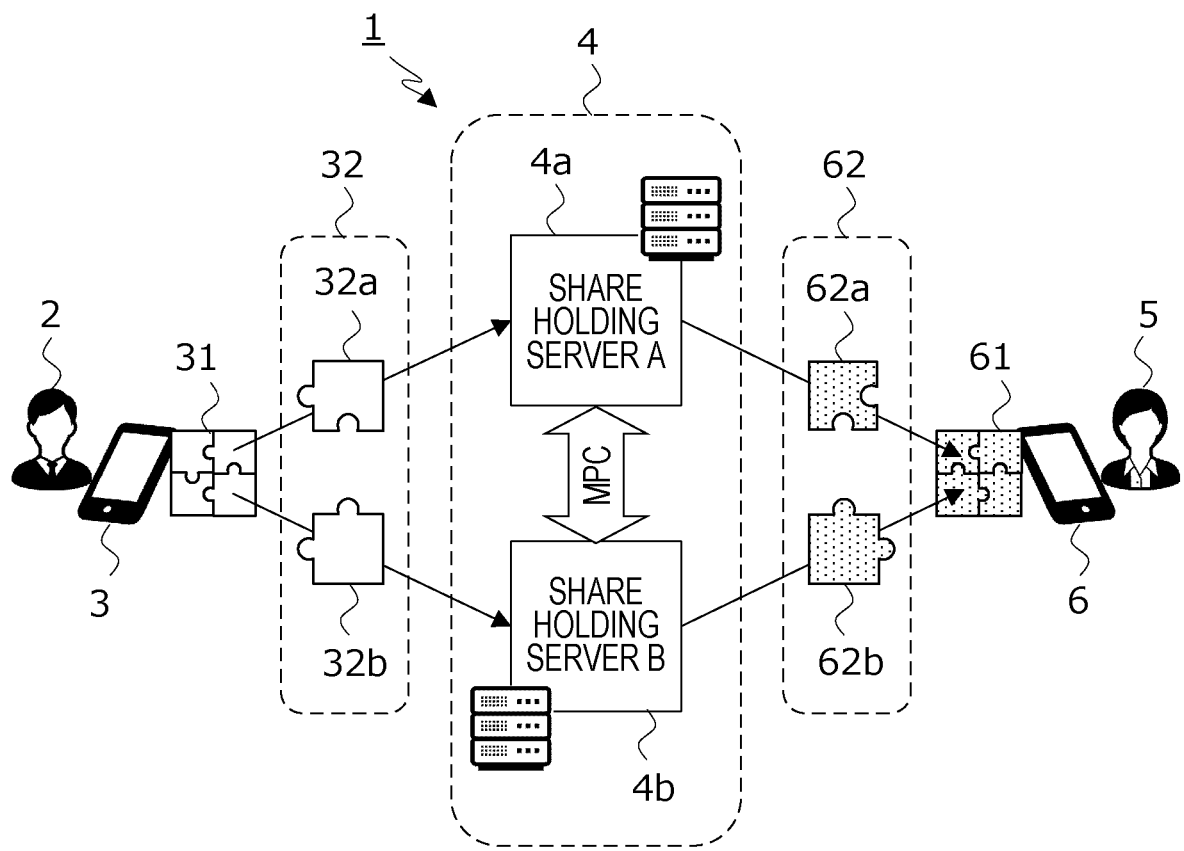
FIG. 1 is a diagram illustrating an outline of a configuration example of a data holding system according to an embodiment of the present invention.
FIG. 2 is a diagram illustrating an outline of an example of share update according to an embodiment of the present invention.

An embodiment of the present invention will be described below in detail. In all the drawings for describing the embodiment, same parts are in principle given same reference numerals, and duplicated description thereof will be omitted. Meanwhile, in the description of the other drawings, the parts described with reference numerals in a certain drawing may be referred to by attaching the same reference numerals though not illustrated again.

<Outline>

A data holding system according to an embodiment of the present invention is a mechanism to hold shares to be utilized by MPC based on m-out-of-n secret distribution (hereinafter, may be referred to as "(m, n) secret distribution", in which original data is distributed into n pieces of shares, and m or more pieces of shares are required to restore the original data) as described in JP 2021-128261 A.

In the technique described in JP 2021-128261 A, a value of a share of each device participating in MPC is periodically updated on the basis of a random number in each environment, a method is designed such that an influence of the random number is canceled and original data is restored by combining shares of the individual devices updated based on the random number, and a revision of a share that is periodically updated and access history information for the share of the revision are recorded in association with each other. In the present embodiment, in the mechanism described above, it becomes possible to further inhibit administrators or the like from colluding and leaking shares of the same revision to obtain original data.

In the (m, n) secret distribution, when m or more pieces among n pieces of shares are collected, original data can be restored. Whereas, when the number of collected shares is up to (m−1), it is not possible to restore the original data, and also not possible to obtain any hint about the original data (not possible to narrow down a possible range of the original data). For example, as an example of (2, 2) secret distribution, when original data is S and two shares are $S_1$ and $S_2$, the shares can be obtained as satisfying the following equation.

$$S=(S_1+S_2) \bmod P \quad \text{(Equation 1)}$$

or $$S=S_1 \text{ XOR } S_2 \quad \text{(Equation 2)}$$

Note that, in Equation 1 above, the operator of "+" is addition, and P is a prime number or a Galois extension field ($2^k$ (k is any integer equal to or larger than a bit length of S)). In addition, in Equation 2, the operator of "XOR" is an exclusive OR. In the present embodiment described below, the share is generated using Equation 1 above, but the present embodiment can be similarly applied to a case where Equation 2 is used.

Figure 3:
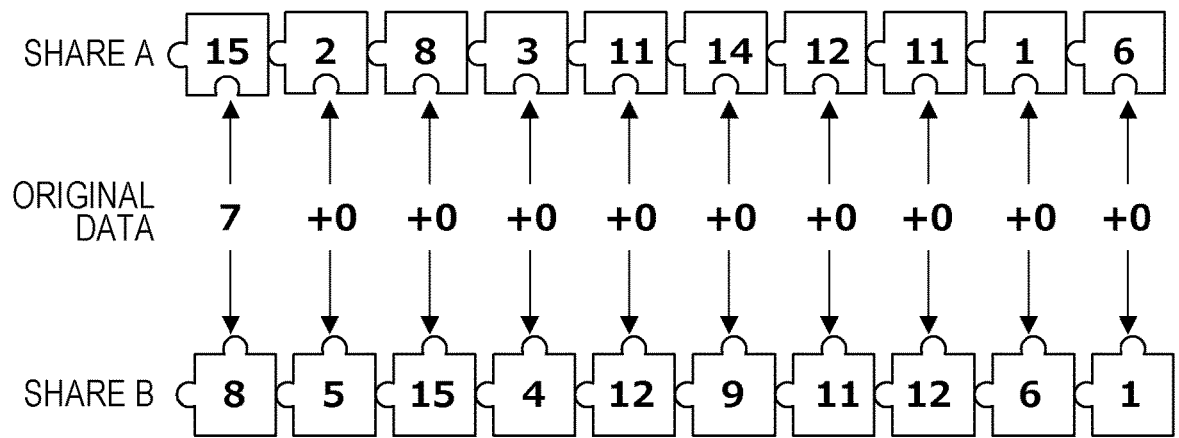
FIG. 3 is a diagram illustrating an outline of an example of share update according to an embodiment of the present invention.

FIGS. 2 and 3 are diagrams illustrating an outline of an example of share update according to an embodiment of the present invention. For example, as illustrated at a left end, in a case where original data is "7", considering a modulus P=16, that is, an environment of circulation with 16 in the above Equation 1, $$(15+8) \bmod 16 = 7$$

is obtained by Equation 1 when a share A ($S_1$)=15 and a share B ($S_2$)=8 as illustrated, and 7 of the original data can be restored.

As described above, in the present embodiment, similarly to the mechanism of JP 2021-128261 A, a share is periodically updated on the basis of a random number in each environment, and an influence of the random number is canceled and original data is restored by combining shares of individual devices updated on the basis of the random number. For example, an influence when the share A and the share B are added by the above Equation 1 can be canceled, by generating a random number for share update, and adding the random number to the share A while subtracting the random number from the share B.

As another example of canceling the influence of the update by the random number, it is also possible to add a random number for update to the share A, and add a value that becomes zero under the modulus 16 to the share B. In the example of FIG. 2, in a case where "3" is generated as the random number for share update with respect to a state at the left end, "3" is added to the share A, and "13", which is a value that becomes zero under the modulus 16 in combination with 3, is added to the share B. In this case, since a sum of the values obtained individually added to the share A and the share B is 0 under the modulus 16, the influence on the original data in Equation 1 above becomes zero. Similarly, when "6" is generated as the random number for share update, it is possible to update the share while making the influence on the original data zero, by adding "6" to the share A while adding "10", which is a value that becomes zero under the modulus 16 in combination with 6, to the share B. This similarly applies to the following examples.

FIG. 3 illustrates an example in which a value for update is sequentially added to each share to calculate a share value in the example of FIG. 2. In updating a value "15" of the share A at a left end, as illustrated in the example of FIG. 2, when "3" is added under the modulus 16, $$(15+3) \bmod 16 = 2$$

is obtained, and the value of the share A is "2". Similarly, in updating a value "8" of the share B, as illustrated in the example of FIG. 2, when "13" is added under the modulus 16, $$(8+13) \bmod 16 = 5$$

is obtained, and the value of the share B is "5". Here, from the updated share A and share B, $$(2+5) \bmod 16 = 7$$

is obtained by using Equation 1, and "7" of the original data can be restored. This similarly applies to the following examples illustrated in FIG. 3. It can be seen that, the original data can be correctly restored from the share A and the share B each sequentially updated on the basis of the same update random number in this way, that is, from the share A and the share B of the same revision. On the other hand, the original data is not able to be correctly restored in a shifted relationship in which the share A and the share B do not correspond to each other, that is, the share A and the share B are of different revisions.

Figure 4:
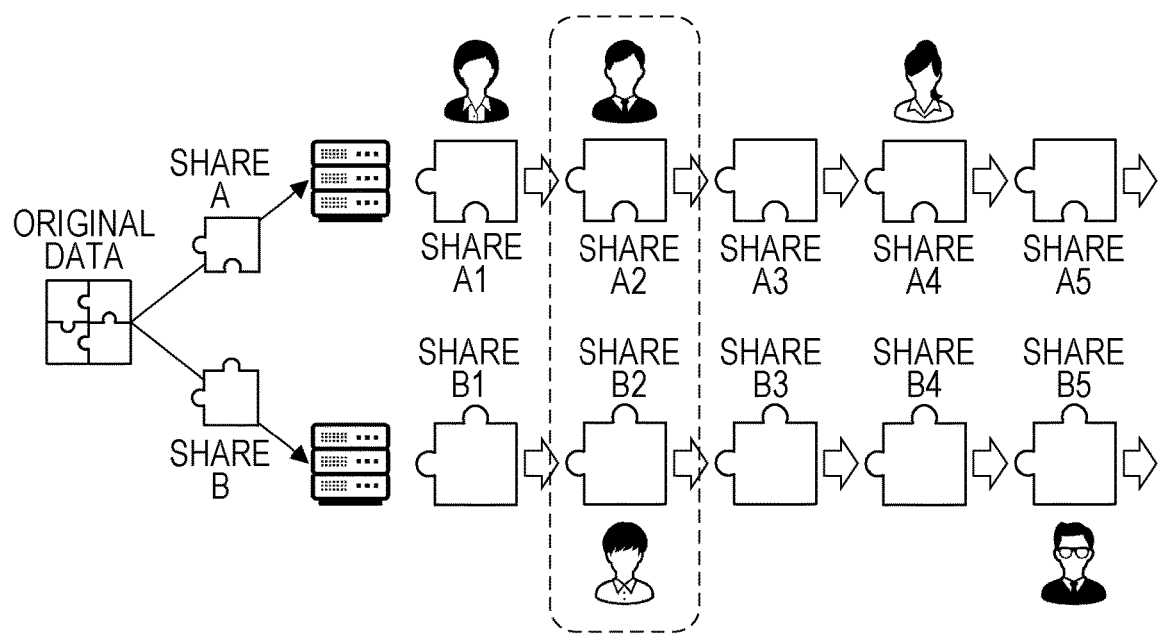
FIG. 4 is a diagram illustrating an outline of an example of a collusion inhibition mechanism according to an embodiment of the present invention.

FIG. 4 is a diagram illustrating an outline of an example of a collusion inhibition mechanism according to an embodiment of the present invention. The example of FIG. 4 illustrates a situation in which the share A and the share B generated from the original data by the above-described method are distributed and stored on different environments (servers), and each share is sequentially updated by a random number in each environment. Note that, it is assumed that revision information is managed in each environment, and a timing of updating the revision is also shared. For example, a periodic update timing may be determined, such as updating at a timing of 24:00 once a day or updating once every 10 minutes, and each environment may follow the update timing. Alternatively, while the update timing is irregular, the individual environments may be mutually agreed by communication to synchronize the revision update timing.

As described above, the original data is not able to be correctly restored unless the shares are of the same revision. Therefore, for example, as in "share A1", "share A4", and "share B5" in the figure, even if an administrator or the like of each environment accesses and acquires the share, original data is not to be breached unless a total of m or more pieces (two in the example of FIG. 4) of corresponding shares of the same revision are accessed.

Whereas, in a case where shares of the same revision are collusively accessed by the administrators or the like of individual environments as in the "share A2" and the "share B2", the original data is to be restored. However, in order to access the shares of the same revision, it is necessary to access at the same time zone. Therefore, by recording an access history in each environment, it is possible to narrow down the administrators or the like who have caused data breach afterwards, which enables to improve traceability and serves as a deterrent.

The technique described in JP 2021-128261 A is a method for identifying a person who has attempted to illegally restore original data, by periodically performing proactive secret sharing (PSS) which improves confidentiality by updating a share value, and leaving an access history for a share in each environment. On the other hand, the data holding system according to an embodiment of the present invention inhibits m or more pieces of shares from being acquired and original data from being restored, by locking access to shares on the remaining (n−(m−1)) environments where access has not occurred, when access to shares occurs in (m−1) pieces of environments (parties, servers).

In a case of this mechanism, basically, the original data is not able to be restored at all. Whereas, for example, for data such as a secret key managed in a wallet program for holding crypto-assets (virtual currency), it is sufficient that limited calculation processing such as signature by the MPC can be performed in the state of shares, and there is no need (or almost no need) to restore the original data at all. In such an application, there is no particular problem even if the original data is not able to be restored, and rather, breach of original data such as a secret key can be inhibited at a high level.

Note that, as described above, in the present embodiment, values of shares are updated by the PSS method, but the PSS method is not limited to that exemplified above. Any method can be adopted as long as the PSS is based on an additive secret distribution method.

<System Configuration>

FIG. 1 is a diagram illustrating an outline of a configuration example of a data holding system according to an embodiment of the present invention. A data holding system 1 includes, for example, n or more pieces of share holding servers 4. The example of FIG. 1 illustrates a configuration including two share holding servers A (4a) and B (4b) as environments that hold two shares generated by (2, 2) secret distribution in a data owner terminal 3 used by a data owner 2 who owns original data 31. The figure also illustrates a data verifier terminal 6 used by a data verifier 5 who verifies result data 61 which is a calculation result of MPC performed by each share holding server 4. The configuration may include the data owner terminal 3 and the data verifier terminal 6, as the data holding system 1. Note that communication is enabled between each of the share holding servers 4 and the data owner terminal 3 and between each of the share holding servers 4 and the data verifier terminal 6, through a network such as the Internet (not illustrated).

Each share holding server 4 includes a server device, a virtual server constructed on a cloud computing service, a PC, or the like, and achieves various functions related to holding of a share 32 and the MPC, by a central processing unit (CPU) (not illustrated) executing an operating system (OS) expanded on a memory from a recording device such as a hard disk drive (HDD) or a solid state drive (SSD), or executing middleware such as a database management system (DBMS) and a web server program or software operating thereon. Note that each share holding server 4 may be individually managed by separate independent environments (parties), and specific configurations thereof may be different as long as the above-described functions can be realized.

Each of the data owner terminal 3 and the data verifier terminal 6 includes an information processing terminal such as a PC, a tablet terminal, or a smartphone, and achieves various functions related to generation and distributed storage of the share 32, verification of the result data 61, and the like, by a CPU (not illustrated) executing an OS expanded on a memory from a recording device such as an HDD or an SSD or executing middleware such as a web browser or other software operating thereon.

The example of FIG. 1 illustrates that two shares 32 of a share A (32a) and a share B (32b) are generated from the original data 31 in the data owner terminal 3, and are held in the share holding server A (4a) and the share holding server B (4b), respectively. Whereas, the example of FIG. 1 illustrates that the data verifier terminal 6 acquires two result shares 62 of a result share A (62a) and a result share B (62b) which are results of calculation processing of MPC performed on the share A (32a) and the share B (32b) between the share holding server A (4a) and the share holding server B (4b), and the result data 61 is restored and the result of the calculation processing is verified.

Figure 5:
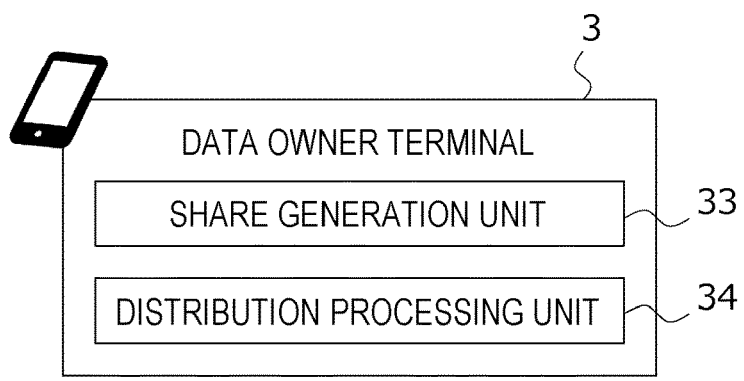
FIG. 5 is a diagram illustrating an outline of a configuration example of a data owner terminal according to an embodiment of the present invention.

FIG. 5 is a diagram illustrating an outline of a configuration example of the data owner terminal 3 according to an embodiment of the present invention. The data owner terminal 3 includes, for example, individual units such as a share generation unit 33 and a distribution processing unit 34 which are implemented as software. The share generation unit 33 has a function of generating n pieces of shares 32 for the original data 31 with (m, n) secret distribution. In addition, the distribution processing unit 34 has a function of transmitting the n pieces of shares 32 generated by the share generation unit 33 to mutually different n pieces of share holding servers 4 to be distributed and stored.

Figure 6:
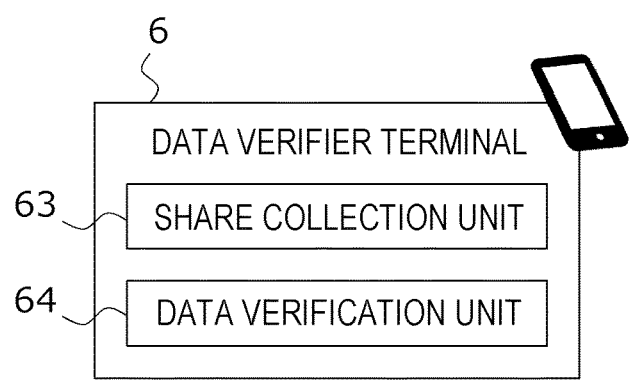
FIG. 6 is a diagram illustrating an outline of a configuration example of a data verifier terminal according to an embodiment of the present invention.

FIG. 6 is a diagram illustrating an outline of a configuration example of the data verifier terminal 6 according to an embodiment of the present invention. The data verifier terminal 6 includes, for example, individual units such as a share collection unit 63 and a data verification unit 64 which are implemented as software. The share collection unit 63 has a function of acquiring m or more pieces of result shares 62 which are results of calculation processing of MPC in individual share holding servers 4, from m or more pieces of share holding servers 4. In addition, the data verification unit 64 has a function of restoring the result data 61 from the m or more pieces of result shares 62 acquired by the share collection unit 63, to obtain a calculation result of the MPC. The data verification unit 64 may have a function of performing predetermined processing on the calculation result and verifying the processing result.

Figure 7:
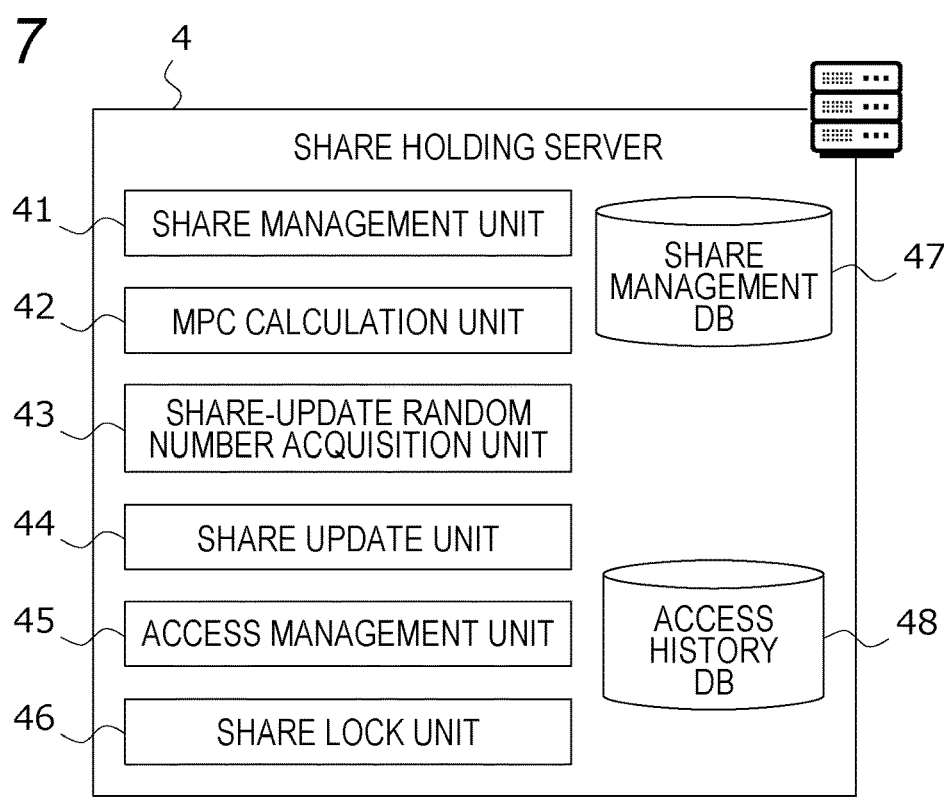
FIG. 7 is a diagram illustrating an outline of a configuration example of a share holding server according to an embodiment of the present invention.

FIG. 7 is a diagram illustrating an outline of a configuration example of the share holding server 4 according to an embodiment of the present invention. The share holding server 4 includes, for example, individual units such as a share management unit 41, an MPC calculation unit 42, a share-update random number acquisition unit 43, a share update unit 44, an access management unit 45, and a share lock unit 46, which are implemented as software. In addition, the share holding server 4 includes each data store such as a share management database (DB) 47 and an access history DB 48, which are implemented by a database, a file table, or the like.

The share management unit 41 has a function of recording and holding the share 32 transmitted from the data owner terminal 3 in the share management DB 47, and performing processing of receiving and handling a request such as reference, update, or deletion for the share 32 held in the share management DB 47. In addition, the MPC calculation unit 42 has a function of giving a request to another share holding server 4 or receiving a request from another share holding server 4, referring to the share 32 via the share management unit 41, and performing calculation processing of the requested MPC. The MPC calculation unit 42 may have a function of recording the result share 62 of the calculation result in the share management DB 47 via the share management unit 41.

The share-update random number acquisition unit 43 has a function of acquiring a random number for periodically updating a value of the share 32, as implementation of the above-described PSS on the share 32 held in the share management DB 47. The share update unit 44 has a function of updating a value of the share 32 in cooperation with or in synchronization with another share holding server 4 on the basis of the random number acquired by the share-update random number acquisition unit 43, and generating a new revision of the share 32.

As described above, the present embodiment is designed such that each share holding server 4 periodically updates the share 32 with a random number, and an influence of the random number is canceled and the original data 31 is restored when the shares 32 (shares 32 of the same revision) of individual share holding servers 4 updated on the basis of the random number are combined. Note that the random number for update may be generated by, for example, another random number generation server (not illustrated) or the like, and each share holding server 4 may acquire the random number from the random number generation server. Alternatively, the share-update random number acquisition unit 43 of any of the share holding servers 4 may generate the random number, and another share holding server 4 may acquire the random number from the share-update random number acquisition unit 43. Note that, when the share 32 is updated, the old share 32 before the update may be discarded or deleted from the share management DB 47.

The access management unit 45 has a function of, when there is an access request for the share 32 held in the share management DB 47, recording a revision of the share 32 at that time in association with the access request and a processing content as history information in the access history DB 48.

While details will be described later, the share lock unit 46 has a function related to a mechanism for determining propriety of access to the share 32 held in the share management DB 47 and locking access and rejecting acquisition of the share 32 in a predetermined case, in cooperation with another share holding server 4. As described above, in the present embodiment, when access to the share 32 occurs in (m−1) pieces of share holding servers 4, access to the share 32 is locked on the remaining (n−(m−1)) pieces of share holding servers 4 for which access has not occurred. Therefore, even if the administrators or the like collude, m or more pieces of shares 32 are inhibited from being acquired and restored to the original data.

<Mechanism of Access Lock>

For example, regarding the configuration as illustrated in FIG. 1 described above in which the shares 32 (the share A (32a) and the share B (32b) in the example of FIG. 1) are generated from the original data 31 by the secret distribution method and are distributed and held in the share holding server 4 (the share holding server A (4a) and the share holding server B (4b) in the example of FIG. 1), classification can be made into the following two patterns.

Figure 8A:
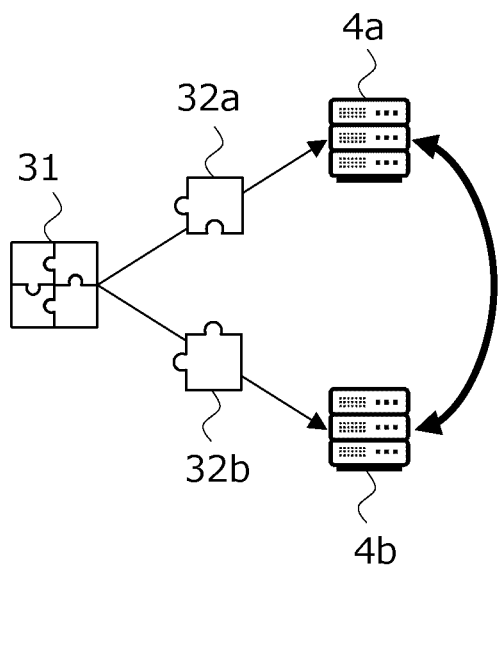
FIGS. 8A and 8B are diagrams illustrating an outline of an example of a configuration in which shares are distributed and held in share holding servers according to an embodiment of the present invention.
Figure 8B:
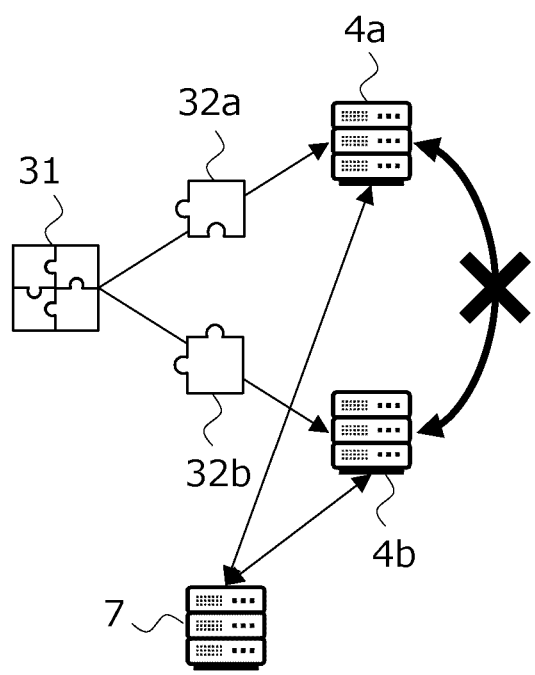

FIGS. 8A and 8B are diagrams illustrating an outline of an example of a configuration in which the shares 32 according to an embodiment of the present invention are distributed and held in the share holding servers 4. Pattern 1 illustrated in FIG. 8A is a configuration in which the individual share holding servers 4 (the share holding server A (4a) and the share holding server B (4b) in the example of FIGS. 8A and 8B) know locations (IP addresses or the like) of one another and can directly communicate with one another. This corresponds to, for example, a form in which each share holding server 4 performs MPC according to the secret distribution method. Pattern 2 illustrated in FIG. 8B is a configuration in which each share holding server 4 does not necessarily have a unit for directly communicating with another share holding server 4. This corresponds to, for example, a situation in which locations (IP addresses or the like) of one another are handled while being concealed, or managed in different networks (the network is divided).

In the case of Pattern 2, processing similar to that in the case of Pattern 1 can be performed when any of the share holding servers 4 or a server or the like other than the share holding servers 4 serves as an intermediary, and indirectly performs communication between the share holding servers 4. The example of FIG. 8B illustrates a configuration in which an intermediary server 7 other than the share holding server 4 is provided as an intermediary. The share holding server A (4a) and the share holding server B (4b) are not able to directly communicate with each other, but can communicate with each other via the intermediary server 7. Note that the role of the intermediary server 7 can also be performed by, for example, a device that can access the original data 31, such as the data owner terminal 3 that holds the original data 31.

Figure 9:
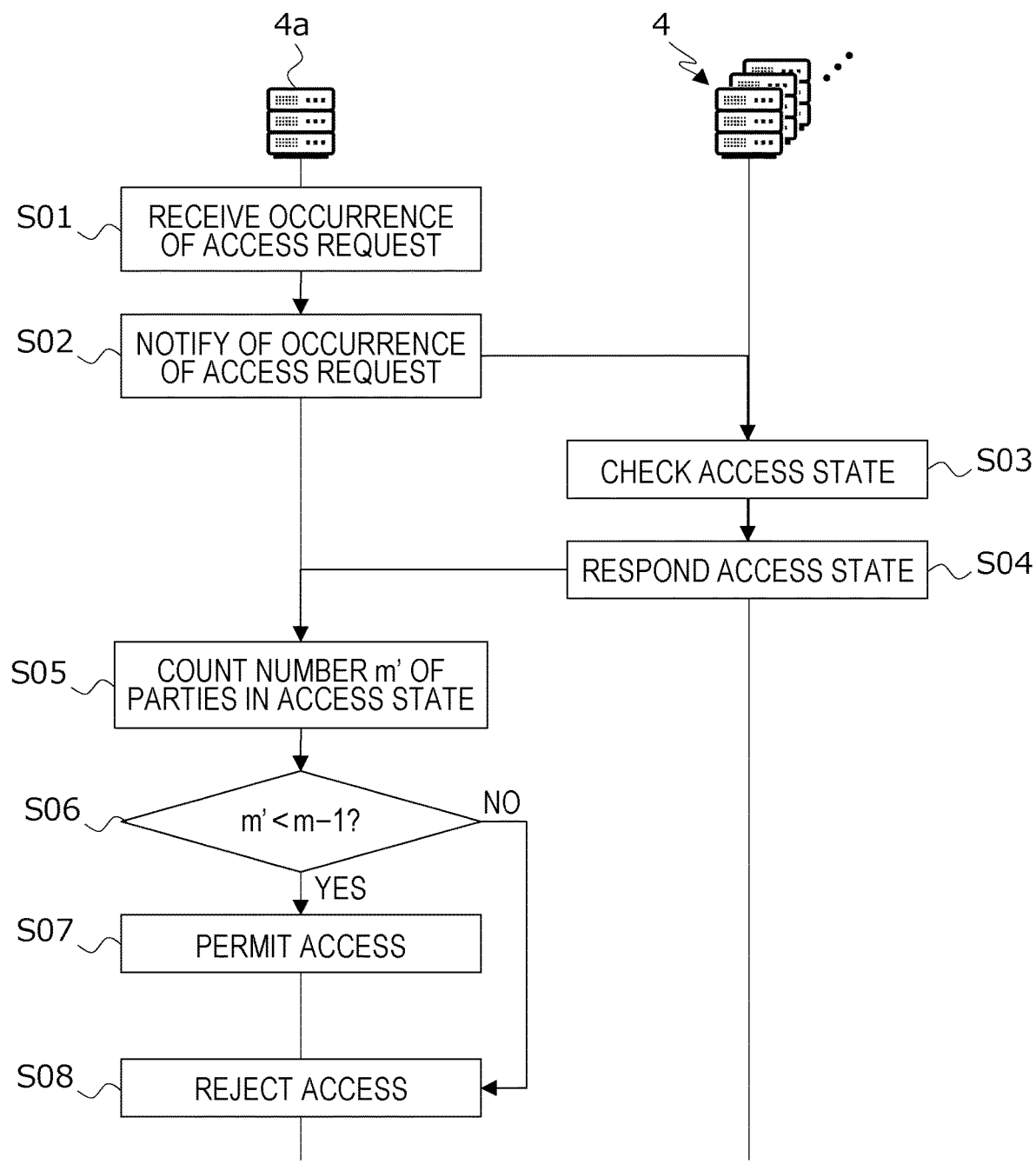
FIG. 9 is a flowchart illustrating an outline of an example of a processing flow related to access locking in an embodiment of the present invention.

FIG. 9 is a flowchart illustrating an outline of an example of a processing flow related to access locking in an embodiment of the present invention. In a situation where access to the share 32 is not locked in each share holding server 4, for example, in a share holding server (in the example of FIG. 9, the share holding server A (4a)) in which an access request for the share 32 has newly occurred (S01), the share lock unit 46 or the like transmits a message indicating "an access request has occurred" to all other (n−1) pieces of share holding servers 4 to give a notification, before permitting access to a user who has made the access request (S02).

In each of the (n−1) pieces of share holding servers 4 that have received the message, the access management unit 45 or the like checks a state of access to the share 32 held by the self (S03), and responds to the share holding server 4 of the message transmission source with information indicating whether or not to be in an access state and information on a current revision of the share 32 (S04). The information indicating whether or not to be in an access state included in the response can be, for example, a BOOL value indicating whether or not to be in an access state, the number of accesses (such as the number of processes accessing), or the like.

In the share holding server A (4a) having received responses from all the (n−1) pieces of share holding servers 4 other than the self, the share lock unit 46 extracts, from the received responses, a response indicating being in the access state and having a revision same as the revision of the share A (32a) held by the self, and counts the number of the responses to obtain the number m' of the share holding servers 4 (parties) currently in the access state (S05). Then, the share holding server A (4a) determines whether or not m' is less than (m−1) (S06), and permits the access request when m' is less than (m−1), since m or more pieces of shares 32 are not to be acquired in total even if the access request from the user is permitted (S07). Whereas, when m' is equal to or more than (m−1), the share holding server A (4a) rejects the access request, since m or more pieces of shares 32 are to be acquired in total when the access request from the user is permitted (S08).

The above processing flow is an example of a normal system in a case where responses are transmitted from all (n−1) pieces of share holding servers 4 other than the share holding server A (4a). However, all the share holding servers 4 are not necessarily in a respondable state, and it is necessary to assume an abnormal system in which some or all of the share holding servers 4 are not able to give a response. Therefore, in the present embodiment, timeout processing is performed by setting an upper limit to waiting time for a response, in the share holding server 4 as a message transmission source.

Figure 10:
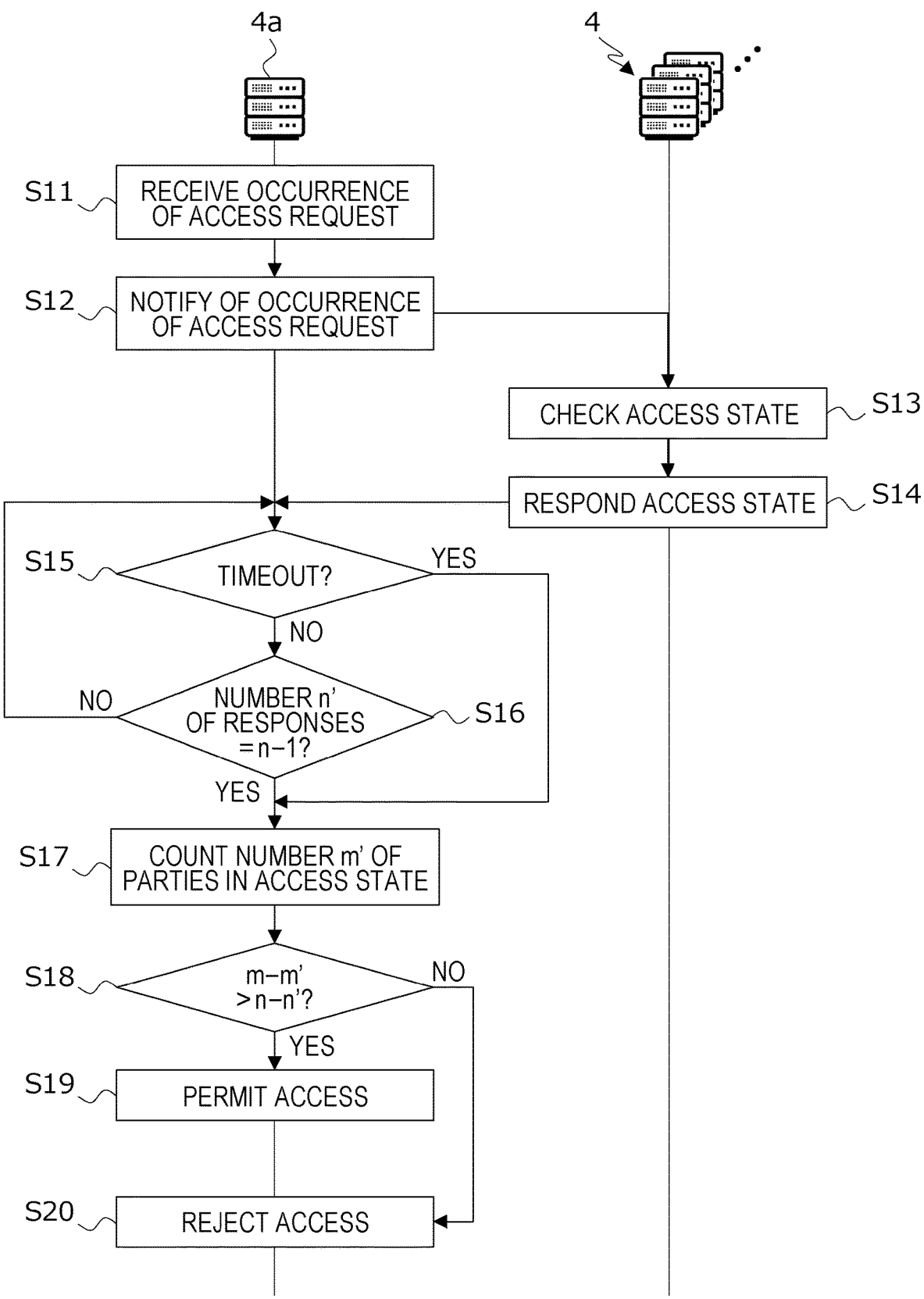
FIG. 10 is a flowchart illustrating an outline of another example of a processing flow related to access locking in an embodiment of the present invention.

FIG. 10 is a flowchart illustrating an outline of another example of a processing flow related to access locking in an embodiment of the present invention. A series of processing from steps S11 to S14 in the figure is similar to steps S01 to S04 in FIG. 9 described above, and thus, repeated descriptions thereof are omitted.

The share holding server A (4a) having transmitted the message "an access request has occurred" in step S12 determines whether or not a timeout has been reached (S15), and determines whether or not the number n' of responses received so far has reached (n−1), until the timeout is reached (S16). When the share holding server A (4a) have received responses from all the other (n−1) pieces of share holding servers 4 other than the self (Yes in step S16) or when the timeout has been reached (Yes in step S15), the share holding server A (4a) counts the number m' of the share holding servers 4 (parties) currently in the access state on the basis of the responses received so far, by processing similar to step S05 in FIG. 9 (S17).

Thereafter, the share holding server A (4a) determines propriety for the access request. The number of share holding servers 4 that have failed to receive a response is (n−n') with respect to the number n' of received responses. When this value is smaller than (m−m') which is a difference between the number m of the shares 32 required at the minimum to restore the original data 31 and the number m' of the share holding servers 4 in the access state, m or more pieces of shares 32 are not to be acquired in total even if all the (n−n') pieces of share holding servers 4 having failed to receive a response are in the access state, and thus it can be said that the original data 31 is not to be restored.

Therefore, the share holding server A (4a) determines whether or not (n−n') is less than (m−m') (S18), and permits the access request from the user when (n−n') is less than (m−m') (S19). Whereas, when (n−n') is equal to or more than (m−m'), there is a possibility that m or more pieces of shares 32 are to be acquired in total, and thus, the share holding server A (4a) rejects the access request from the user (S20). Alternatively, instead of rejecting the access request, for example, "access permission waiting state" may be set, and the process may return to step S11 at a timing when the revision of the share 32 is updated, and a message indicating that "an access request has occurred" may be transmitted again to all other (n−1) pieces of share holding servers 4.

In the method described above, the share holding server 4 having received the access request for the share 32 transmits a message indicating the fact to all other (n−1) pieces of share holding servers 4, and counts the number of share holding servers 4 in the access state from the responses to the message, to determine access propriety based on whether or not there is a possibility that m or more pieces of shares 32 are to be acquired in total.

However, in the method as described above, there is a time lag between occurrence of the access request for the share 32 and actual determination of access propriety. Therefore, for example, when access requests simultaneously occur in a plurality of share holding servers 4, or when there is a share holding server 4 that has given permission to an access request near a timing of updating the revision of the share 32, there is a possibility of a situation in which an access request that should not be allowed is allowed, or an access request that should be allowed is rejected and locked.

In order to avoid such a situation, in the present embodiment, for example, in the share holding server 4 in which the access request has occurred, the share holding server 4 is regarded to be already in the access state even before the access is permitted by the access management unit 45 or the share lock unit 46, and the share holding server 4 gives a response indicating being in the access state (or the number of accesses>0) when receiving the message indicating occurrence of an access request from another share holding server 4.

Whereas, for the share holding server 4 that has given a response indicating being not in the access state (or the number of accesses<1) when receiving the message indicating occurrence of an access request from another share holding server 4, the share holding server 4 continuously responds the current access state every $T_2$ seconds for $T_1$ seconds ($T_1$ and $T_2$ are both any values and can be appropriately adjusted). Alternatively, regardless of whether or not the message indicating occurrence of an access request is received from another share holding server 4, each share holding server 4 may continuously transmit the current access state to all the other (n−1) pieces of share holding servers 4 every $T_2$ seconds.

Then, after transmitting the message indicating occurrence of the access request to the other (n−1) pieces of share holding servers 4, the share holding server 4 in which an access request for the share 32 has occurred continuously receive responses from the other (n−1) pieces of share holding servers 4 for $T_1$ seconds, before determining propriety of access. That is, after waiting for $T_1$ seconds after transmitting the message indicating the occurrence of the access request, the share holding server 4 determines access propriety.

Figure 11A:
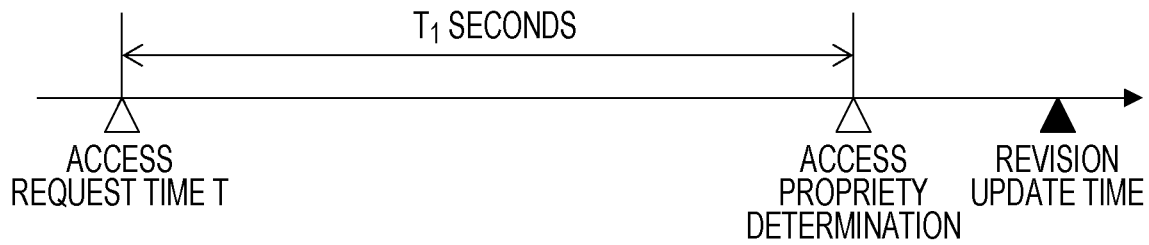
FIGS. 11A to 11C are diagrams illustrating an outline of an example of an access propriety determination timing when an access request has occurred, according to an embodiment of the present invention.
Figure 11B:
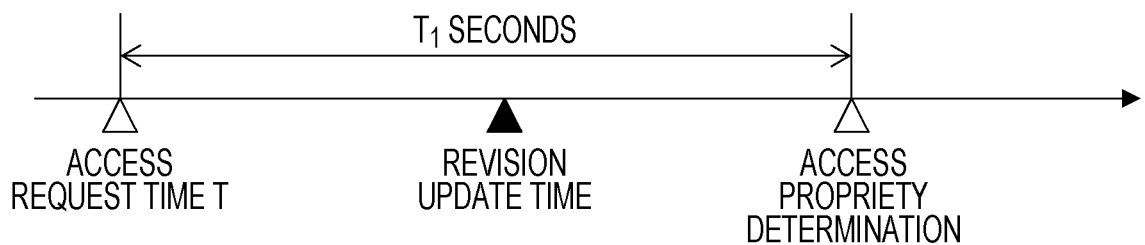
Figure 11C:
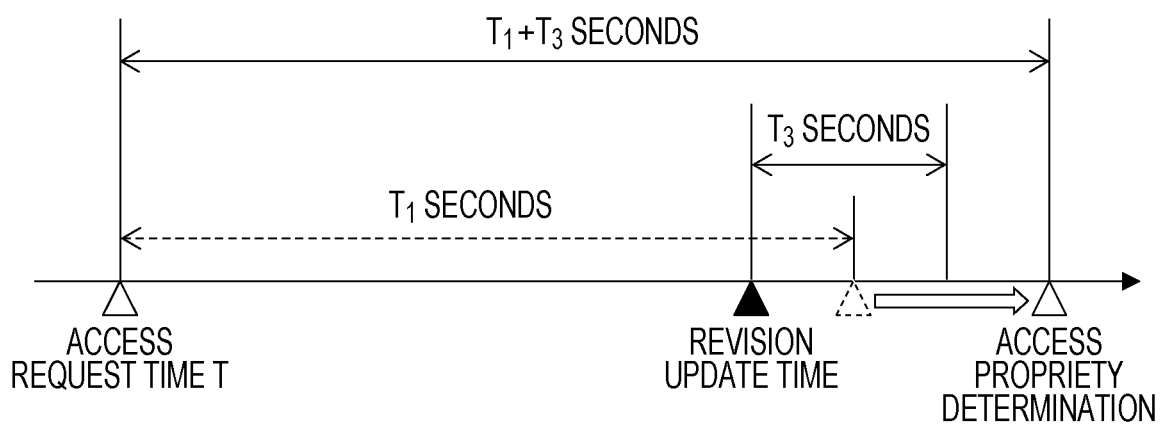

FIGS. 11A to 11C are diagrams illustrating an outline of an example of an access propriety determination timing when an access request has occurred, according to an embodiment of the present invention. Each of FIGS. 11A to 11C illustrates a time T at which an access request has occurred in the share holding server 4, a timing of determining access propriety, and an update timing of a revision of the share 32, in time series from left to right.

FIG. 11A illustrates an example of a case where access propriety is determined at a timing after $T_1$ seconds elapse from the time T at which the access request has occurred, but there is no update of the revision during that time, and the revision is updated after the access propriety is determined. Furthermore, FIG. 11B illustrates an example of a case where the revision is updated before $T_1$ seconds elapse from the time T, and then access propriety is determined.

In this way, there is a case where the revision is updated before $T_1$ seconds elapse. Therefore, in the present embodiment, in responses received from other share holding servers 4 during $T_1$ seconds (including responses continuously transmitted from the same share holding server 4 every $T_2$ seconds), responses having the latest revision for each share holding server 4 are exclusively left. Then, on the basis of this, the number of share holding servers 4 being in the access state and having a revision same as the current revision of the share 32 held by the share holding server 4 is counted as m'. The subsequent processing related to the determination on access propriety is similar to step S06 in FIG. 9 or step S18 in FIG. 10 described above.

FIG. 11C illustrates an example of a case where a period from the revision update time to the timing of determining access propriety (after a lapse of $T_1$ seconds from the time T when the access request has occurred) is too short. In this case, there is a risk that access propriety is determined on the basis of an old revision after the update. Therefore, in this case, that is, as illustrated in the example of FIG. 11C, in a case where a time (a dotted triangle in the figure) after the lapse of $T_1$ seconds from the time T is within $T_3$ seconds ($T_3$ is any value) from the revision update time, the waiting time from the time T to the determination of access propriety may be extended from $T_1$ seconds to $(T_1+T_3)$ seconds, and the access propriety may be determined after a sufficient time has elapsed from the revision update time. As a result, it is possible to more appropriately determine access propriety even for an access request near the revision update timing.

As described above, according to the data holding system 1 according to an embodiment of the present invention, when (m−1) pieces of share holding servers 4 are in the access state for the share 32, that is, when access to the share 32 occurs or is likely to occur, it is possible to inhibit m or more pieces of shares 32 from being acquired and the original data 31 from being restored, by locking access to the shares 32 on the remaining (n−(m−1)) pieces of share holding servers 4 on which access has not occurred yet.

As described above, according to the present embodiment, basically, the original data 31 is not able to be restored at all. However, for data such as a secret key managed in a wallet program for holding crypto-assets (virtual currency), it is sufficient that limited calculation processing such as signature by the MPC can be performed in the state of share 32 as it is, and there is no need (or almost no need) to restore the original data 31 at all. In such an application, there is no particular problem even if the original data 31 is not able to be restored, and rather, breach of the original data 31 such as a secret key can be inhibited at a high level, which is particularly effective.

Whereas, for example, in the share holding server 4 or the like that performs the MPC, access to the share 32 may be frequently performed in a plurality of share holding servers 4 for calculation processing of the MPC, and a problem may occur if access to the share 32 is locked for a process executing the MPC. Therefore, such a process can be individually excluded from the target of the locking. For example, implementation is conceivable in which processes in which access to the share 32 may be permitted in m or more pieces of share holding servers 4 are collected as a whitelist, and the process included in the whitelist is not to be included in the number of accesses when an access state for the share 32 is examined in each share holding server 4.

Similarly, for example, a configuration may be possible in which a privileged account is prepared for handling access to data that is specifically permitted or requested under the laws of each country (for example, various inquiry systems, and the like), and access by the privileged account is not to be included in the number of accesses.

Although the invention made by the present inventors has been specifically described on the basis of the embodiment, the present invention is not limited to the above-described embodiment, and it goes without saying that various modifications can be made without departing from the gist of the present invention. The above-described embodiment has been described in detail in order to explain the present invention in an easy-to-understand manner, and the present invention is not necessarily limited to one including all the configurations described. Another configuration can be added to, deleted from, and replaced with part of the configuration of the above-described embodiment.

Part or all of the above-described configurations, functions, processing parts, processing units, and the like, may be implemented by hardware by being designed as an integrated circuit, or the like. Alternatively, the above configurations, functions, and the like, may be implemented by software by a processor interpreting and executing a program that implements each function. Information such as programs, tables, and files for implementing each function can be stored in a recording device such as a memory, a hard disk, and an SSD, or in a recording medium such as an IC card, an SD card, and a DVD.

The above drawings illustrate control lines and information lines that are considered necessary for the description and do not necessarily illustrate all the implemented control lines and information lines. In reality, almost all the configurations may be considered mutually connected.

The present invention can be used for an event certification system that certifies an event, an action, a fact, or the like.

What is claimed is:

1. A data holding system including n pieces of share holding servers, a number n being an integer, wherein the n pieces of the share holding servers hold n pieces of shares, respectively, the n pieces of shares are generated from original data by additive secret distribution, the n pieces of shares being to be utilized for (m, n) secret distribution based multi-party computation (MPC), where a number m being an integer equal to or smaller than the number n, and (m, n) secret distribution being a secret distribution in which (i) the original data is distributed into n pieces of shares, and (ii) m or more pieces of shares are required to restore the original data the n pieces of the share holding servers share a timing of updating the n pieces of the shares, the n pieces of the share holding servers cooperate at the timing of updating to generate n pieces of shares of a new revision by updating the n pieces of shares based on a random number to cancel an influence of the random number at a time of restoration of the original data from the n pieces of shares of the new revision, the updating the n pieces of shares includes either (i) adding the random number to one of the n pieces of shares while subtracting the random number to another of the n pieces of shares, or (ii) adding the random number to one of the n pieces of shares while adding a certain value to another of the n pieces of shares, a sum of the random number and the certain value being zero under a predetermined modulo operation, in a case of an access to the share of a first revision occurs in (m−1) pieces of the share holding servers among the share holding servers in an access state in which access to the share held by the share holding servers occurs, a request for access to the share is rejected in other (n−(m−1)) pieces of the share holding servers, a number (m−1) being an integer smaller than the number m by one, a number (n−(m−1)) being an integer smaller than the number n by the number (m−1), the n pieces of share holding servers includes a first share holding server and (n−1) pieces of second share holding servers other than the first share holding server, a number (n−1) being an integer smaller than the number n by one, when a request for access to the share held by the first share holding server has occurred, the first share holding server transmits a message to the second share holding servers before permitting the access, the message indicating occurrence of the request for access to the share held by the first share holding server, for each of the second share holding servers, when receiving the message, the second share holding server transmits, to the first share holding server, a response including information indicating whether or not to be in the access state for the share held by the second share holding server and information on a revision of the share held by the second share holding server, and the first share holding server counts a number of the share holding servers in the access state for the share of a revision same as the first revision, based on the responses received from the second share holding servers.

2. The data holding system according to claim 1, wherein the first share holding server receives the responses from the second share holding servers, for a predetermined time after transmitting the message, and rejects the request for access to the share held by the first share holding server when a number (m−m') is equal to or less than a number (n−n') after a lapse of the predetermined time, based on a number n' of the second share holding servers each having received the response and based on a number m' of the share holding servers in the access state, the number m' being counted based on the received responses, the number (m−m') being a difference between the number m and the number m' the number m being a minimum number of the shares required to restore the original data, and the number (n−n') being a number of the second share holding servers from which the responses have not been received.

3. The data holding system according to claim 2, wherein in a case where the number (m−m') is equal to or less than the number (n−n'), instead of rejecting the request for access to the share held by the first share holding server, the first share holding server waits for update of a revision of the share, and transmits the message again to each of other (n−1) pieces of the second share holding servers after update of the revision of the share.

4. The data holding system according to claim 1, wherein for each of the second share holding servers, in a case where a request for access to the share held by the second share holding servers occurs, when the second share holding server receives the message transmitted from the first share holding server, the second share holding server transmits, to the first share holding server, the response indicating being in the access state for the share held by the second share holding server, even before determining whether or not to permit access to the share held by the second share holding server.

5. The data holding system according to claim 1, wherein for each of the second share holding servers, when the second share holding server transmits the response indicating being not in the access state for the share held by the second share holding server in response to the message received from the first share holding server, the second share holding server continuously transmits, to the first share holding server, the response including information indicating whether or not to be in the access state for the share held by the second share holding server, for every second period during a first period thereafter, the second period being shorter than the first period.

6. The data holding system according to claim 5, wherein when the request for access to the share held by the first share holding server occurs, the first share holding server receives the responses from the second share holding servers, during a period from when the first share holding server transmits the message to the second share holding servers to when the first period elapses before permitting the access, and counts the number of the share holding servers in the access state for the share of the revision same as the first revision after elapse of the first period, based on the response indicating a latest revision among the responses received from the second share holding servers.

7. The data holding system according to claim 6, wherein in a case where the first period has elapsed after the first share holding server transmits the message to the second share holding servers during a period from when the revision of the share held by the first share holding server is updated to the first revision to when the third period has elapsed, the first share holding server receives the responses from the second share holding servers, until the third period further elapses after the first period has elapsed, and counts the number of the share holding servers in the access state for the share of the revision same as the first revision after the third period further elapses after the first period has elapsed, based on the response indicating a latest revision among the responses received from the second share holding servers.

8. The data holding system according to claim 1, wherein for each of the second share holding servers, regardless of whether or not the message is received from the first share holding server, the second share holding server continuously transmits the response including information on whether or not to be the access state for the share held by the second share holding server, to other (n−1) pieces of the share holding servers every second period.

* * * * *